United States Patent [19]

Utaka et al.

[11] Patent Number: 5,315,422
[45] Date of Patent: May 24, 1994

[54] OPTICAL MACH-ZEHNDER TYPE LOGIC ELEMENT WHICH PERFORMS AN XOR OPERATION

[75] Inventors: Katsuyuki Utaka; Yasuyuki Nagao, both of Tokyo; Yuichi Matsushima, Tokorozawa; Kazuo Sakai, Tokyo, all of Japan

[73] Assignee: Kokusai Denshin Denwa Kabushiki Kaisha, Tokyo, Japan

[21] Appl. No.: 22,016

[22] Filed: Feb. 24, 1993

[30] Foreign Application Priority Data

Feb. 28, 1992 [JP] Japan ................... 4-075749

[51] Int. Cl.$^5$ ................... G02B 6/10; G02B 26/00
[52] U.S. Cl. ................... 359/107; 385/3; 385/5
[58] Field of Search ................... 385/1–5; 359/107

[56] References Cited

U.S. PATENT DOCUMENTS

4,973,122 11/1990 Cotter et al. ................... 385/1
5,091,980 2/1992 Ogawa et al. ................... 385/3

Primary Examiner—Frank Gonzalez
Attorney, Agent, or Firm—Emmanuel J. Lobato; Robert E. Burns

[57] ABSTRACT

An optical logic element is disclosed which performs an XOR operation through utilization of the high-speed property of light. On each branched waveguide of a Mach-Zehnder interference type optical waveguide there is provided a phase modulating element whose refractive index undergoes a change when it is irradiated by light. The interference type optical waveguide is adapted to provide different optical output levels when the refractive index changes of the phase modulating elements are both zero or a predetermined value and when they differ from each other. Thus, the optical logic element is capable of performing the XOR or XNOR operation at an ultrahigh speed.

4 Claims, 7 Drawing Sheets

OPTICAL MACH-ZEHNDER TYPE LOGIC ELEMENT WHICH PERFORMS AN XOR OPERATION

BACKGROUND OF THE INVENTION

The present invention relates to an optical logic element for controlling an optical signal by light, which is indispensable to high-speed optical signal processings in the fields of optical switching and optical information processings.

It is now being expected that wide-band, new services, such as moving picture communication and image distribution, are developed extensively through utilization of the optical fiber communication technology which permits ultrawide band, ultrahigh-speed transmission. In this instance, ultrahigh-speed signal processing is indispensable at a node at which wide-band signals center. To meet with this requirement, particular attention is being directed to a so-called optical switching, optical signal processing system which processes optical signals intact or processes them making the most use of properties of light and which can therefore be expected to allow a high-speed switching operation and afford further reduction of the processing time through parallel processing, in comparison with a system which once converts optical signals to electrical signals and processes them by the use of an LSI or similar electronic circuit.

One of important functions in optical signal processing is a signal identifying function for identifying an input optical signal to provide it to a desired path. Usually, a signal composed of a digital sequence uses its bit pattern as an indication for recognition, and it can be said that the signal identifying function is to perform a bit pattern matching operation. The bit pattern matching means a function which determines whether digital signal bits of a plurality of input signal cells, allotted to each time slot, match or not, thereby ultimately determining whether the cells match or not. To inplement such a function, an optical logic element is needed which performs an exclusive-OR (XOR) or exclusive-NOR (XOR) operation as a logical operation which provides a different output signal, depending on whether all the above-mentioned plurality of bits assume the same states "1" (or "0") or not.

Figure 9:
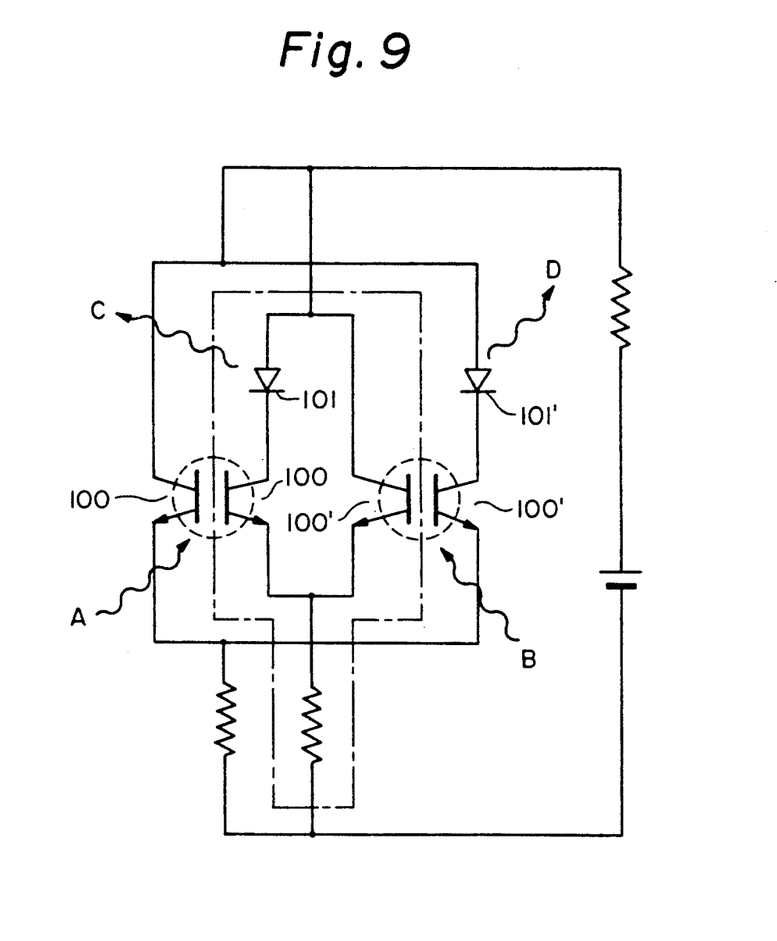
FIG. 9 is a circuit diagram showing an example of a conventional optical logic element.
Figure 10:
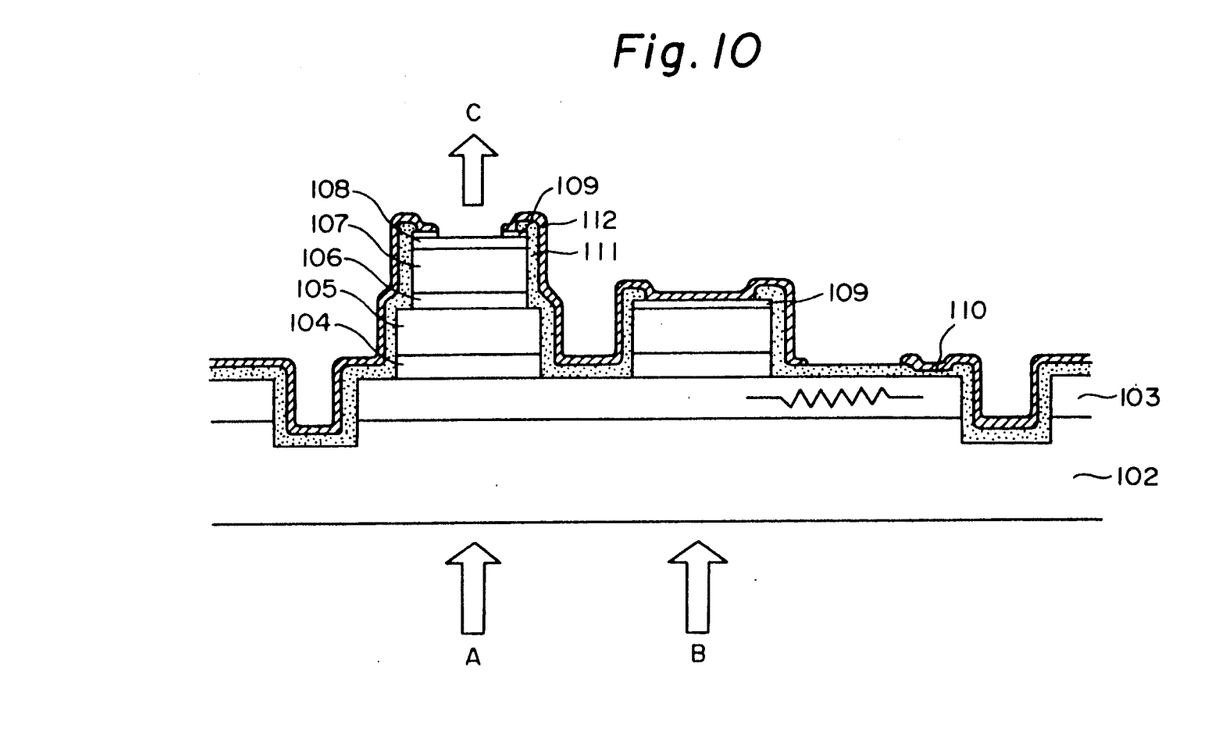
FIG. 10 is a sectional view showing an example of the construction of the prior art optical logic element.

FIG. 9 shows a conventional XOR optical logical element. Reference numerals 100 and 100' denote photo-transistors (HPT's) each composed of n-InP, p-InGaAsP and n-Inp layers and 101 and 101' LED's each composed of n-Inp, InGaAsP and p-InP layers. The LED's are each connected in series to one of the two HPT's which are simultaneously irradiated with input light beams A and B, and two such unit cells are connected in parallel to the power supply. FIG. 10 shows a cross-sectional structure of the unit cell surrounded by a one-dot chain line. Reference numeral 102 indicates a semi-insulating InP layer, 103 an n-InP layer, 104 a p-InGaAsP layer, 105 an n-InP layer, 106 an InGaAsP layer, 107 a p-InP layer, 108 a p-InGaAsP layer, 109 an Au-Zn layer, 110 an Au-Sn layer, 111 a polyimide layer, and 112 a Ti/Au layer. The InGaAsP layers 104 and 106 correspond to a base layer of each HPT and a light emitting layer of each LED, respectively. Assuming that only the input light A (or B) is applied as shown in FIG. 9, the HPT 100 (or 100') are turned ON and the HPT 100' (or 100) connected in parallel thereto are turned OFF, and consequently, only the LED 101 (or 101') emits light. On the other hand, when the input light beams A and B are simultaneously applied, only those of the HPT's 100 and 100' which are not connected to the LED's 101 and 101' are turned ON, with a result that a current will not flow through either of the LED's 101 and 101' and hence they will not emit light. In the absence of the input light beams A and B, a current does not flow through none of the HPT'S, and hence they do not emit light. It will be seen from the above that the optical inputs A and B to the HPT's and the optical outputs C and D from the LED's bear a relationship just like an exclusive-NOR (XOR).

The conventional XOR optical logic element has a shortcoming that its operating speed is not so high, because it converts an optical signal to an electrical signal by phototransistors and then drives light emitting diodes of slow operating speed to obtain therefrom an optical output as mentioned above. Moreover, the prior art XOR optical logic element has a complicated structure, and hence calls for a complex manufacturing process.

SUMMARY OF THE INVENTION

It is an object of the present invention to provide an optical logic element which performs the XOR operation through utilization of the high-speed property of light.

To attain the above object, the optical logic element according to the present invention has a construction in which a phase modulating element, whose refractive index is changed by light irradiation, is disposed on each optical waveguide branched from a Mach-Zehnder interference type optical waveguide and the said interference type waveguide is adapted to provide a different optical output level, depending on whether a change in the refractive index of each phase modulating element is zero or equal to a predetermined value. Thus, the optical logic element of the present invention is able to perform the XOR or XNOR operation at an ultrahigh speed.

BRIEF DESCRIPTION OF THE DRAWINGS

The present invention will be described in detail below with reference to the accompanying drawings, in which.

PREFERRED EMBODIMENTS OF THE INVENTION

Embodiment 1

Figure 1:
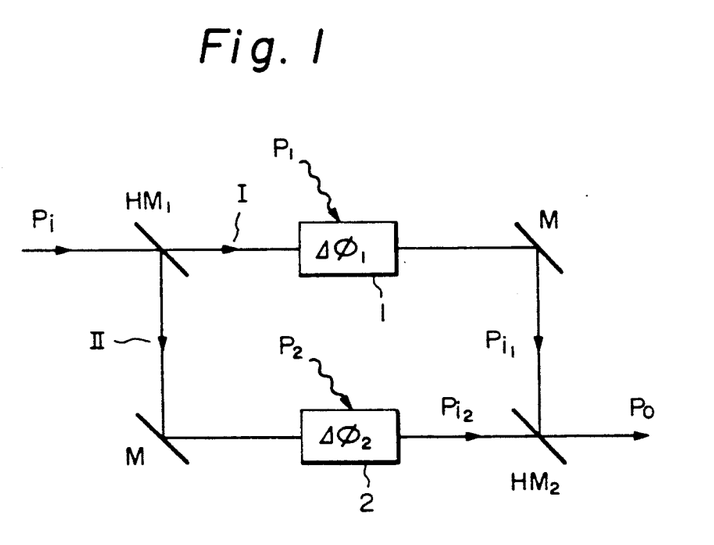
FIG. 1 is a perspective view showing an embodiment in which the optical logic element of the present invention, which includes phase modulating elements incorporated in a Mach-Zehnder interferer, is applied to a spatial propagation type optical system.

FIG. 1 is a block diagram for explaining the basic operation of the optical logic element according to the present invention. For the sake of simplicity, a description will be given of an example of spatial propagation. Incident light $P_i$ from left is branched by a half mirror $HM_1$ to paths I and II and the thus split light beams are combined again with each other by a half mirror $HM_2$ the obtain an optical output $P_o$. This optical system has a Mach-Zehader interference type construction in which the optical output Po is provided as the result of interference of components corresponding to phase variations of the incident light $P_i$ in the respective paths. The present invention has its feature in that phase modulating elements 1 and 2, whose refractive indexes vary when they are irradiated by light, are each provided in one of the branched optical path of the Mach-Zehnder interference type optical system. Next, the basic operation of this embodiment will be described. Let it be assumed, for example, that the branched optical paths I and II are equal in length to each other when control light beams $P_1$ and $P_2$ to the phase modulating elements 1 and 2 are both zero in intensity. In this instance, phase variations $\Delta\phi_1$ and $\Delta\phi_2$ of light beams $P_{i1}$ and $P_{i2}$ of the same intensity which are incident to the half mirror $HM_2$ are both zero, that is, the incident light beams have the same phase, and consequently, the optical output $P_o$ is provided. Letting $P_1$ and $P_2$ represent the quantities of control light which will provide a phase variation $\pi$ in each phase modulating element and assuming that light of the intensity $P_1$ is incident to the phase modulating element 1, the light beams $P_{i1}$ and $P_{i2}$ have a phase difference $\pi$ therebetween, and hence they are cancelled by each other, with the result that the output light $P_o$ becomes zero. The same is true also in a case of irradiating only the phase modulating element 2 by the control light $P_2$. When the both phase modulating elements 1 and 2 are irradiated by the control light beams $P_1$ and $P_2$, respectively, the light beams $P_{i1}$ and $P_{i2}$ incident to the half mirror $HM_2$ both undergo a phase variation $\pi$, and hence are in-phase with each other, providing the optical output $P_o$. Table 1 shows the above-described operations, in the form of a truth table, in accordance with combination of control light beams.

TABLE 1

| | | | | Output | |
|---|---|---|---|---|---|
| $P_1$ | $\Delta\phi_1$ | $P_2$ | $\Delta\phi_2$ | symmetrical | asymmetrical |
| 0 | 0 | 0 | 0 | $P_0$ | 0 |
| $P_1$ | $\pi$ | 0 | 0 | 0 | $P_0$ |
| 0 | 0 | $P_2$ | $\pi$ | 0 | $P_0$ |
| $P_1$ | $\pi$ | $P_2$ | $\pi$ | $P_0$ | 0 |

The above example has been described in connection with the optical system in which the branched optical paths are equal in length to each other. It will be seen from the above table that the optical logic element of the present invention functions as an exclusive-OR (XOR) element. On the other hand, in the case where the lengths of the branched optical paths I and II are selected such that they provide a phase difference $\pi$ therebetween in the absence of the control light, the optical logic element can be used as an exclusive-NOR (XNOR) element, as seen from the "asymmetrical" column in Table 1.

Next, a description will be given of an embodiment of the present invention in which the above-described basic construction is applied to a more practical semiconductor optical waveguide.

Embodiment 2

Figures 2A, 2B:
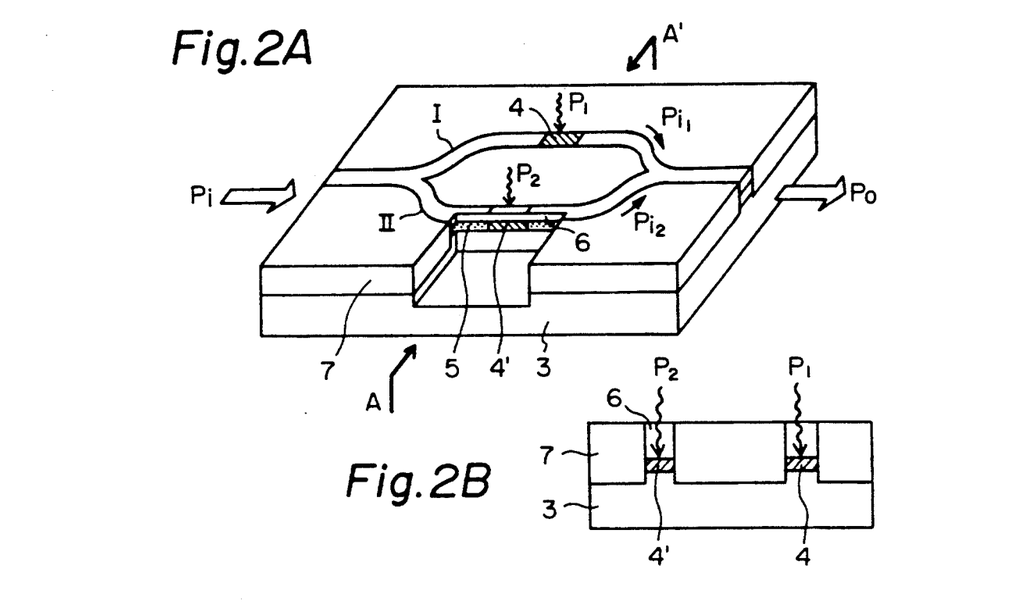
FIGS. 2A and 2B illustrate, in perspective and in section, an embodiment in which the optical logic element of the present invention, which includes phase modulating elements incorporated in the Mach-Zehnder interferer, is applied to a waveguide structure and the phase modulating elements are each disposed in one of branched waveguides.

FIG. 2A illustrates a second embodiment of the invention in which the first embodiment shown in FIG. 1 is implemented by a monolithic Mach-Zehnder interference type waveguide structure.

This embodiment is shown to use semiconductors of the InGaAsP systems. Reference numeral 3 denotes an InP substrate, 4 and 4' multiple quantum well structures (MQW's) formed of InGaAs/InP (wavelength corresponding to the energy band, $\lambda g=1.55$ $\mu m$), 5 an InCaAsP waveguide layer ($\lambda g=1.3$ $\mu m$), 6 an InP clad layer, and 7 an InP buried layer. These structures and layers are formed by a growth method such as an MOCVD or MBE process. The waveguide is provided as a three-dimensional waveguide by the use of a buried structure, which forms a Mach-Zehnder interference structure wherein the waveguide is branched at the center thereof into two waveguides I and II and they are jointed together. In the branched waveguides I and II the MOW's 4 and 4' are provided as phase modulating elements, as seen from FIG. 2B which is a section taken on the line A-A' in FIG. 2A.

Next, a description will be given of the operation of this embodiment. It is known that the MOW is highly nonlinear to light. The MOW's 4 and 4' function as phase modulating elements whose refractive indexes undergo a change when they are irradiated by light. The control light beams $P_1$ and $P_2$ are applied to the MOW's 4 and 4', respectively. Although in this embodiment the light beams are applied from above, they may also be applied from under the substrate or from lateral directions through other waveguides. The signal input light $P_i$ is incident to the optical logic element from the left and the output light $P_o$ is emitted from the right-hand end face of the element. Assuming that optical logic element has the symmetrical structure wherein the branched waveguides I and II are equal in length to each other, phase variations in the both waveguides are equal to each other when the control light beams $P_1$ and $P_2$ are not applied to the MOW's 4 and 4', and consequently, the branched or split light components $P_{i1}$ and $P_{i2}$ are in-phase with each other before they are mutually combined. Hence, the signal light is output as $P_O$. Next, assume that either one of the control light beams $P_1$ and $P_2$ is applied to the corresponding MOW at an intensity high enough to provide a phase variation $\pi$. In this instance, the branched or split light components $P_{i1}$ and $P_{i2}$ are displaced by a phase difference $\pi$ from each other, and hence are cancelled by each other, with a result that the optical output $P_o$ is not yielded. In a case where the control light beams $P_1$ and $P_2$ are simultaneously applied, even if the split light components $P_{i1}$ and $P_{i2}$ each undergo a phase change by $\pi$, they are still in-phase, and hence are output as $P_o$ without being cancelled by each other. Thus, the control light beams $P_1$ and $P_2$ and the output $P_o$ bear the XNOR logical relationship as shown in the "Symmetrical" column of Table 1 as in the case with Embodiment 1.

Now, the quantity of control light $P_\pi$, which is needed to implement the phase variation $\Delta\phi(\pi)$ in the above-mentioned MOW, will be computed.

$$\Delta\phi = 2\pi\Delta n_\pi L/\lambda = \pi$$

From the above, a desired refractive index is given as follows:

$$\Delta n_\pi = \lambda/2L \sim 0.008$$

Where L is the length of the MOW and $\lambda$ is the wavelength. In the above, $L=100$ $\mu$m and $\lambda=1.55$ $\mu$m. It has been reported that the nonlinearity constant $n_2$ (where $n=n_0+n_2 \cdot I/I$; irradiating light intensity) is as large as $10^{-5} \sim 10^{-4}$ cm$^2$/W. Assuming that $n_2 = 10^{-4}$ cm$^2$/W, the desired irradiating light intensity is as follows:

$$I = \Delta n_\pi/n_2 = 80 \text{ W/cm}^2$$

This indicates that if the area of the MOW for irradiation by light is $100 \times 10$ $\mu$m in view of its size, the quantity of control light $P\pi$ will be 0.8 mW, and hence a light power of several mW will be enough for the control light.

Figure 3:
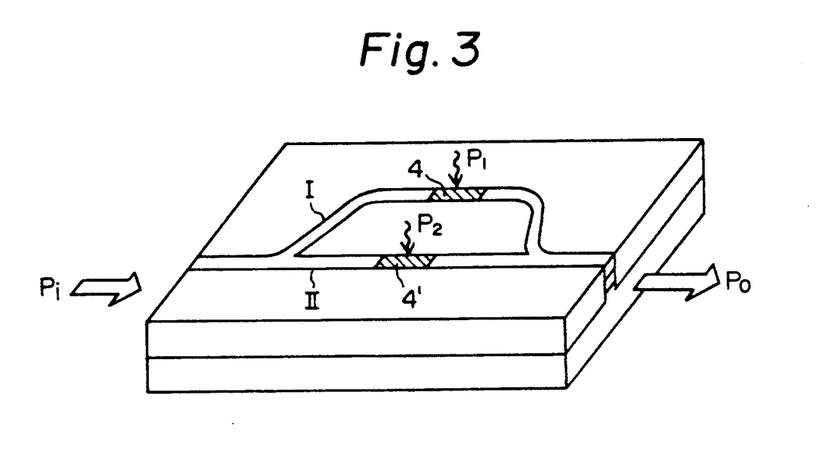
FIG. 3 is a perspective view illustrating an embodiment in which branched waveguides differ in length from each other by a half wavelength.

While the above embodiment has been described in conjunction with the symmetrical structure in which the branched waveguides I and II have the same path length, the same logical operation as described above can be obtained even with an asymmetrical structure in which the path length of a predetermined one of the branched waveguides is shortened or lengthened by a half wavelength, that is, a phase difference $\pi$ is provided between the branched waveguides. In this case, the optical logic element performs the XOR logical operation as shown in Table 1. The path length difference corresponding to the half wavelength could be obtained by changing the lengths of the waveguides as depicted in FIG. 3, by changing the widths of the waveguides to change their effective refractive indexes, or by changing the refractive indexes of the waveguides by applying thereto currents or voltages.

Figure 4:
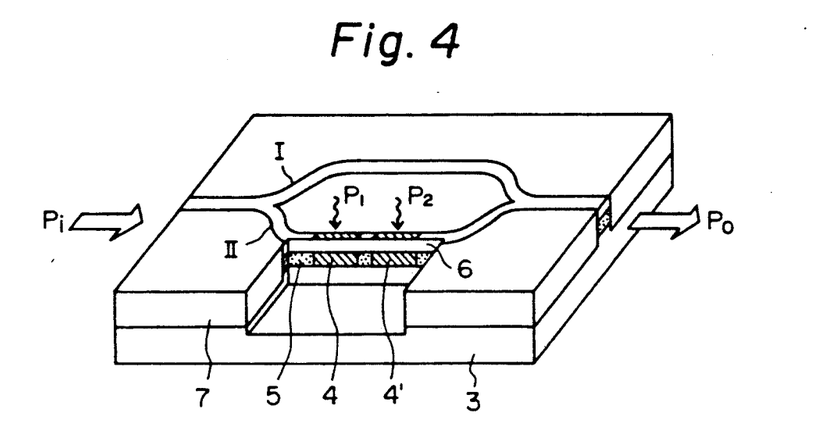
FIG. 4 is a perspective view illustrating another embodiment of the present invention in which two phase modulating elements are disposed in one of two branched waveguides.

While in the above the phase modulating elements are provided in respective branched waveguides, it is also possible to obtain exactly the same operation as described above, by providing the two phase modulating elements in only one of the branched waveguides. FIG. 4 illustrates its embodiment, which is identical in construction with the FIG. 2 embodiment except that the two phase modulating elements are provided in one of the branched waveguides.

Embodiment 3

Figure 5:
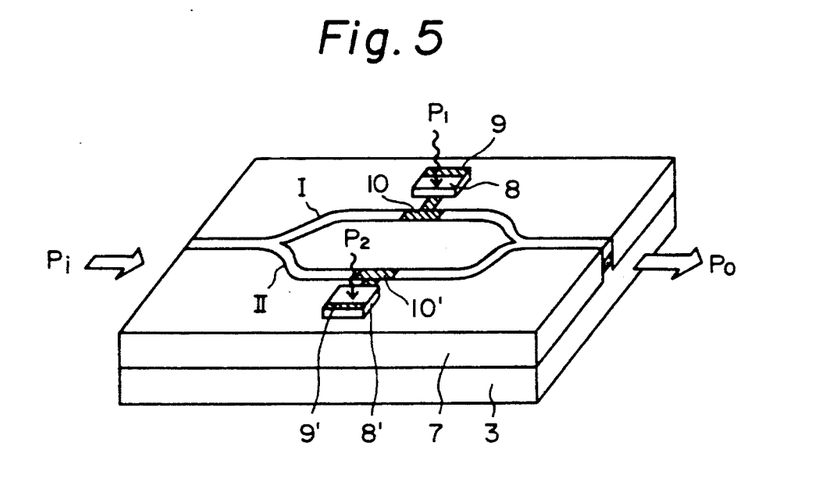
FIG. 5 is a perspective view illustrating another embodiment of the present invention in which a phase variation of the phase modulating element is caused by a current injection after photo-electric conversion.

In the above embodiments the phase modulating elements are directly irradiated by light, but FIG. 5 illustrates an embodiment in which light is applied indirectly to the phase modulating elements to change their refractive indexes. Reference numerals 8 and 8' denote photoelectric converting parts each formed by a phototransistor (HPT), and 9 and 9' electrodes for supplying bias voltages to the photoelectric converting element parts. Currents, which are generated by irradiating the photoelectric converting parts 8 and 8' with light, are injected via the electrodes 10 and 10' into the underlying waveguide layers to change their refractive indexes, providing desired phase variations. This embodiment has its feature in that the freedom degrees in the internal construction of the optical logic element increases, since the light irradiating part and the phase modulating element part can be separated from each other. Incidentally, the same effect obtainable with current injection can also be produced by voltage application.

Embodiment 4

The foregoing embodiments have been described in respect of an ideal state of operation in which the phase modulating elements have phase variations 0 and $\pi$ and, after combining the light beams having propagated through the branched waveguides, the light intensity of the light beams combined becomes about the same as that $P_O$ of the incident light $P_i$ or the light beams are cancelled by each other substantially completely to be reduced to zero. The reason for this is that the light intensity difference which is obtained by the two states of operation is maximum and hence is easy to identify. If, however, an output light-detecting level can be controlled with a high degree of accuracy, a desired function can be performed even by he use of an operation which provides an intermediate optical output.

Now, consider a case in which the phase variations $\Delta\phi$ of the respective phase modulating elements are $\pi/2$ and $-\pi/2$, respectively. The output of the symmetrical Mach-Zehnder interference type waveguide, if assumed to be loss-free, is given by the following equation.

$$P_O = P_i/4 \cdot |exp(j\Delta\phi_1) + exp(j\Delta\phi_2)|^2 = P_i \cos^2[(\Delta\phi_1 - \Delta\phi_2)/2]$$

In this case, it can be seen that when $\Delta\phi_1 = \Delta\phi_2 = 0$, a condition; $P_O = P_i$ is satisfied, when $\Delta\phi_1 = \pi/2(O)$ and $\Delta\phi_2 = 0$ $(-\pi/2)$, $P_O = P_i/2$, and when $\Delta\phi_1 = \pi/2$ and $\Delta\phi_2 = -\pi/2, P_O 32$ O. In a case of the asymmetrical structure, a value of $\pi$ needs only to be added to the phase variation of one of the phase modulating elements, by which can be obtained such an input/output relationship as shown below in Table 2.

TABLE 2

|  |  |  |  | Output | |
| --- | --- | --- | --- | --- | --- |
| $P_1$ | $\Delta\phi_1$ | $P_2$ | $\Delta\phi_2$ | symmetrical | asymmetrical |
| 0 | 0 | 0 | 0 | $P_0$ | 0 |
| $P_1$ | $\pi/2$ | 0 | 0 | $P_0/2$ | $P_0/2$ |
| 0 | 0 | $P_2$ | $-\pi/2$ | $P_0/2$ | $P_0/2$ |
| $P_1$ | $\pi/2$ | $P_2$ | $-\pi/2$ | 0 | $P_0$ |

Figure 6A:
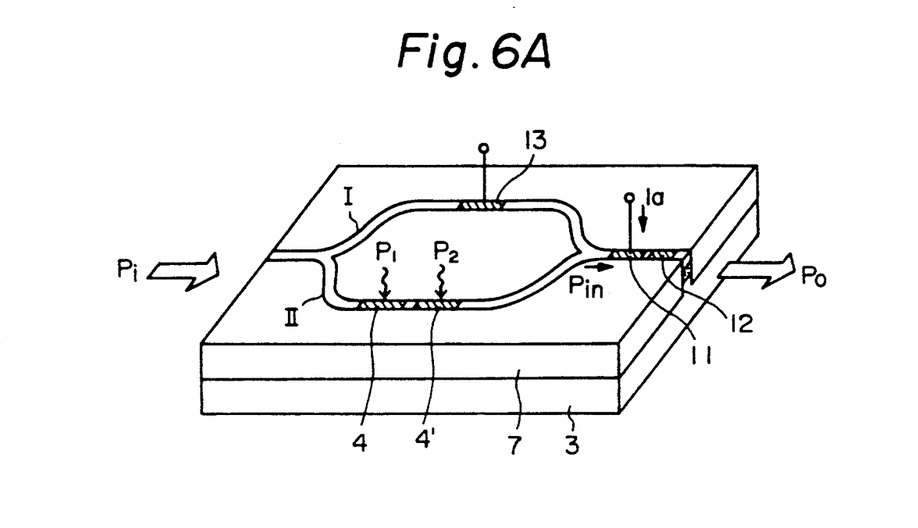
FIGS. 6A and 6B show a perspective view illustrating another embodiment of the present invention which is provided with a variable light level discriminator and a graph explanatory of the operation of the variable light level discriminator.
Figure 6B:
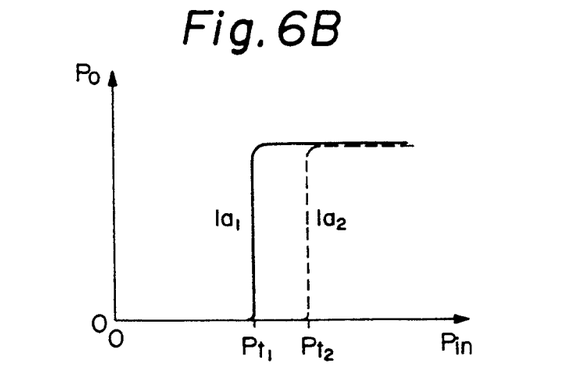

It will be seen from the above that when the optical output-detecting level $P_t$ is set such that $P_O/2 < P_t < P_O$, the symmetrically-structured element performs an NOR operation and the asymmetrically-structured element an AND operation, and that when the level $P_t$ is set such that $0<P_t<P_O/2$, the symmetrically-structured element performs an NAND operation and the asymmetrically-structured element an OR operation. It is possible to employ, as an optical detector, such an optical nonlinear element as depicted in FIG. 6A, which has a saturable absorbing region. Reference numerals 11 and 12 denote regions formed of InGaAsP which has a band-gap-corresponding wavelength longer than the wavelength of the input light, and the region 11 functions as an amplifying region which has a gain obtained by current injection, whereas the region 12 serves as a saturable absorbing region. When the current which is injected into the amplifying region 11 is set to $I_{a1}$ or $I_{a2}$ ($<I_{a1}$), since the former has a larger amplification gain than does the latter, the saturable absorbing region 12 is turned ON with smaller input light $P_{in}=P_{t1}$ ($<P_{t2}$), providing the output light $P_O$. That is, the switching level $P_t$, converted in terms of the effective intensity of light incident to the optical discriminator, can be set to an arbitrary value such as $P_{t1}$ or $P_{t2}$ as shown in FIG. 6B, by the use of the current $I_a$ which is injected into the amplifying region 11. Reference numeral 13 indicates a phase modulator for adjusting the optical path length as described in detail with reference to Embodiment 2.

Embodiment 5

The above-described embodiments use two control light beams. Even if three or more control light beams are employed, it is possible to implement logical operations by a plurality of input light beams by providing phase modulating elements at proper positions and through the use of the above-mentioned optical detector.

Figure 7:
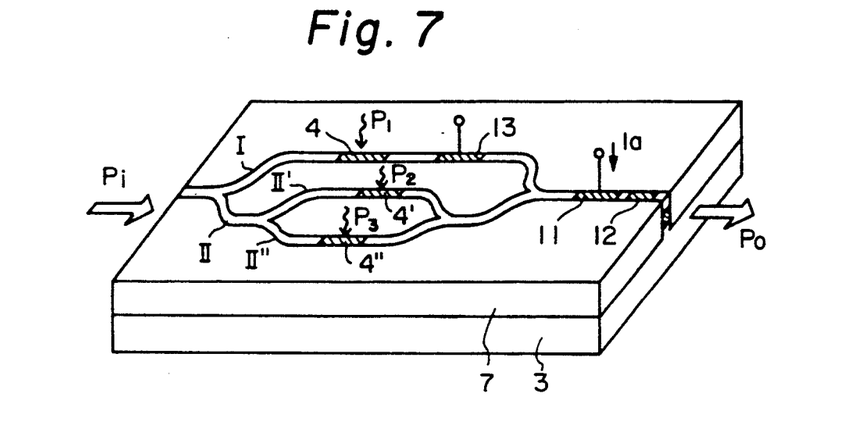
FIG. 7 is a perspective view illustrating another embodiment of the present invention which uses three control light beams.
Figure 8A:
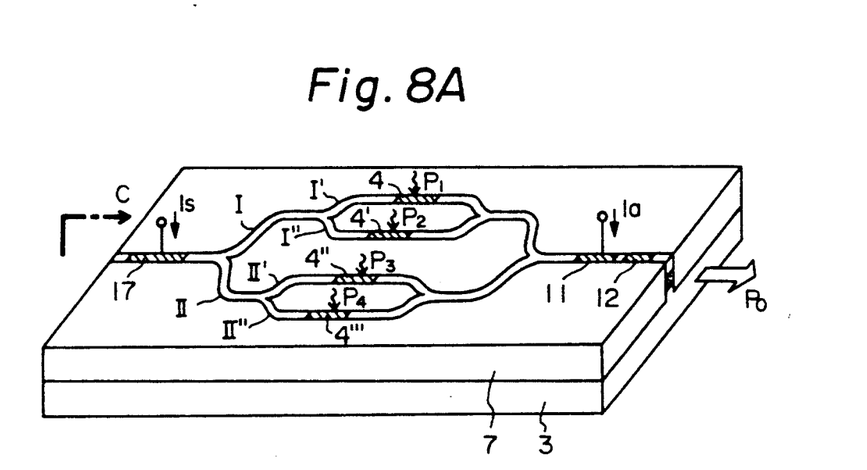
FIGS. 8A and 8B show a perspective view of an embodiment, which uses four control light beams, and its partly cut-away sectional view.

FIGS. 7 and 8 illustrate embodiments which employ three and four control light beams, respectively. The number of branched waveguides changes in accordance with the number of control light beams used, and phase modulating elements are provided in the branched waveguides, as indicated by reference numerals 4, 4', 4" and 4'''. Reference numeral 13 indicates an phase adjuster for adjusting the optical path length, 11 an amplifying region, and 12 a saturable absorbing region, which constitute the optical detector. The relationships among each control light and the output in FIGS. 7 and 8 are given below in Tables 3 and 4.

TABLE 3

| | | | Output | |
|---|---|---|---|---|
| $P_1$ | $P_2$ | $P_3$ | symmetrical | asymmetrical |
| 0 | 0 | 0 | $P_{in}$ | 0 |
| 0 | $P_2$ | 0 | $P_{in}/2$ | $P_{in}/2$ |
| 0 | $P_2$ | $P_3$ | 0 | $P_0$ |
| $P_1$ | 0 | 0 | 0 | $P_0$ |
| $P_1$ | $P_2$ | 0 | $P_{in}/2$ | $P_{in}/2$ |
| $P_1$ | $P_2$ | $P_3$ | $P_{in}$ | 0 |

TABLE 4

| | | | | Output | |
|---|---|---|---|---|---|
| $P_1$ | $P_2$ | $P_3$ | $P_3$ | symmetrical | asymmetrical |
| 0 | 0 | 0 | 0 | $P_{in}$ | $P_0$ |
| $P_1$ | 0 | 0 | 0 | $P_{in}/2$ | 0 |
| $P_1$ | $P_2$ | 0 | 0 | 0 | 0 |
| $P_1$ | 0 | $P_3$ | 0 | 0 | 0 |
| $P_1$ | $P_2$ | $P_3$ | 0 | $P_{in}/2$ | 0 |

TABLE 4-continued

| | | | | Output | |
|---|---|---|---|---|---|
| $P_1$ | $P_2$ | $P_3$ | $P_3$ | symmetrical | asymmetrical |
| $P_1$ | $P_2$ | $P_3$ | $P_4$ | $P_{in}$ | $P_0$ |

Figure 8B:
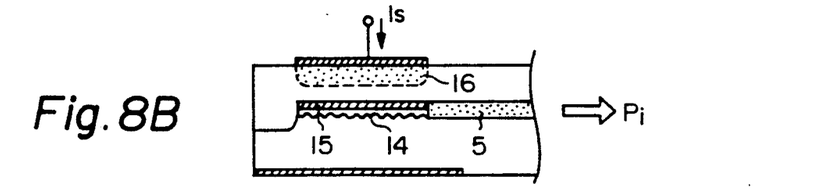

It will be seen from the above that when the detection level $P_t$ of the optical detector is set to $P_{in}/2<P_t<P_{in}$ in the cases of the symmetrical structure of Table 3 and Table 4 and $0<P_t<P_{in}/2$ in the case of the asymmetrical structure in Table 3, what is called a bit pattern matching function, by which an optical output is obtained only when all control light inputs are zero or applied, can be implemented. Incidentally, this embodiment employs, as a signal light source, an integrated λ/4-shifted DFB laser 17. FIG. 8B is a sectional view taken in the direction indicated by the arrow C in FIG. 8A. Reference numeral 14 denotes a λ/40 shifted corrugation grating, 15 an InGaAsP active layer, and 16 a zinc-diffused region, which oscillates at a single wavelength of good coherence when a current $I_s$ is injected thereinto, and its output $P_i$ is provided via a low-loss waveguide 5 to the optical logic element according to the present invention.

While the foregoing embodiments have been described in connection with the case where semiconductor materials of the InGaAsP systems are used, it is also possible to use a combination of various materials, such as semiconductor materials of the AlGaAs or some other systems or $SiO_2$ or similar dielectric materials for the waveguides and optical nonlinear materials such as other semiconductor-doped glass for the phase modulating elements.

The present invention permits the implementation of an ultra-high speed optical logic element utilizing interference of light. Moreover, when used in combination with an optical discriminator employing a saturable absorber, the optical logic element is capable of performing various optical logic operations such as AND, NAND, OR and NOR as wells as XOR and NXOR. Furthermore, the integration of a plurality of elements on a common substrate allows a multi-bit parallel optical logic operation. Hence, the present invention is of great utility in the fields of optical switching and optical information processings.

What we claim is:
1. An optical logic element comprising:
   a Mach-Zehnder interference type optical path for branching an input optical path into a plurality of optical paths which are joined together to form a light output optical path, and
   a plurality of phase modulating elements disposed in at least one of said branched optical paths, the refractive index of each of said phase modulating elements being controlled by the intensity of light applied thereto, and
   the intensity of output light obtained from said light output optical path being controlled in accordance with a combination of the intensities of light applied to said plurality of phase modulating elements.
2. An optical logic element comprising:
   a Mach-Zehnder interference type optical path having an input optical path for receiving input light and branching into a plurality of optical paths which are joined together to form a light output optical path, the light output optical path compris- ing a current injection region and a saturable absorbing region, a plurality of phase modulating elements disposed in at least one of said plurality of branched optical paths, the refracting index of each of said phase modulating elements being controllable by the intensity of the light applied thereto, and the intensity of output light obtained from said light output optical path being controlled in accordance with a combination of the intensities of light applied to said plurality of phase modulating elements.

3. An optical logic element according to claim 1 or 2, in which each of said phase modulating elements comprises optical nonlinear materials controlled by light directly applied thereto.

4. An optical logic element according to claim 1 or 2, further comprising photoelectric converting elements provided to control the respective refractive indexes of said phase modulating elements by respective electric signals.

* * * * *